Fig. 1 LAYOUT

INVENTOR.
GEORGE ELLIOTT
BY Winfred T. Powell
ATTORNEY

REVERTING
CALL SWITCH CIRCUIT

INVENTOR.
GEORGE ELLIOTT
BY
Winfred T. Powell
ATTORNEY

Nov. 17, 1953 G. ELLIOTT 2,659,769

TELEPHONE REVERTING CALL SYSTEM

Filed Sept. 30, 1949 5 Sheets-Sheet 3

REVERTING CALL SWITCH CIRCUIT

INVENTOR.
GEORGE ELLIOTT

BY

Winfred T. Powell
ATTORNEY

CONNECTOR

INVENTOR.
GEORGE ELLIOTT
BY Winfred T. Powell
ATTORNEY

Nov. 17, 1953 G. ELLIOTT 2,659,769
TELEPHONE REVERTING CALL SYSTEM
Filed Sept. 30, 1949 5 Sheets-Sheet 5
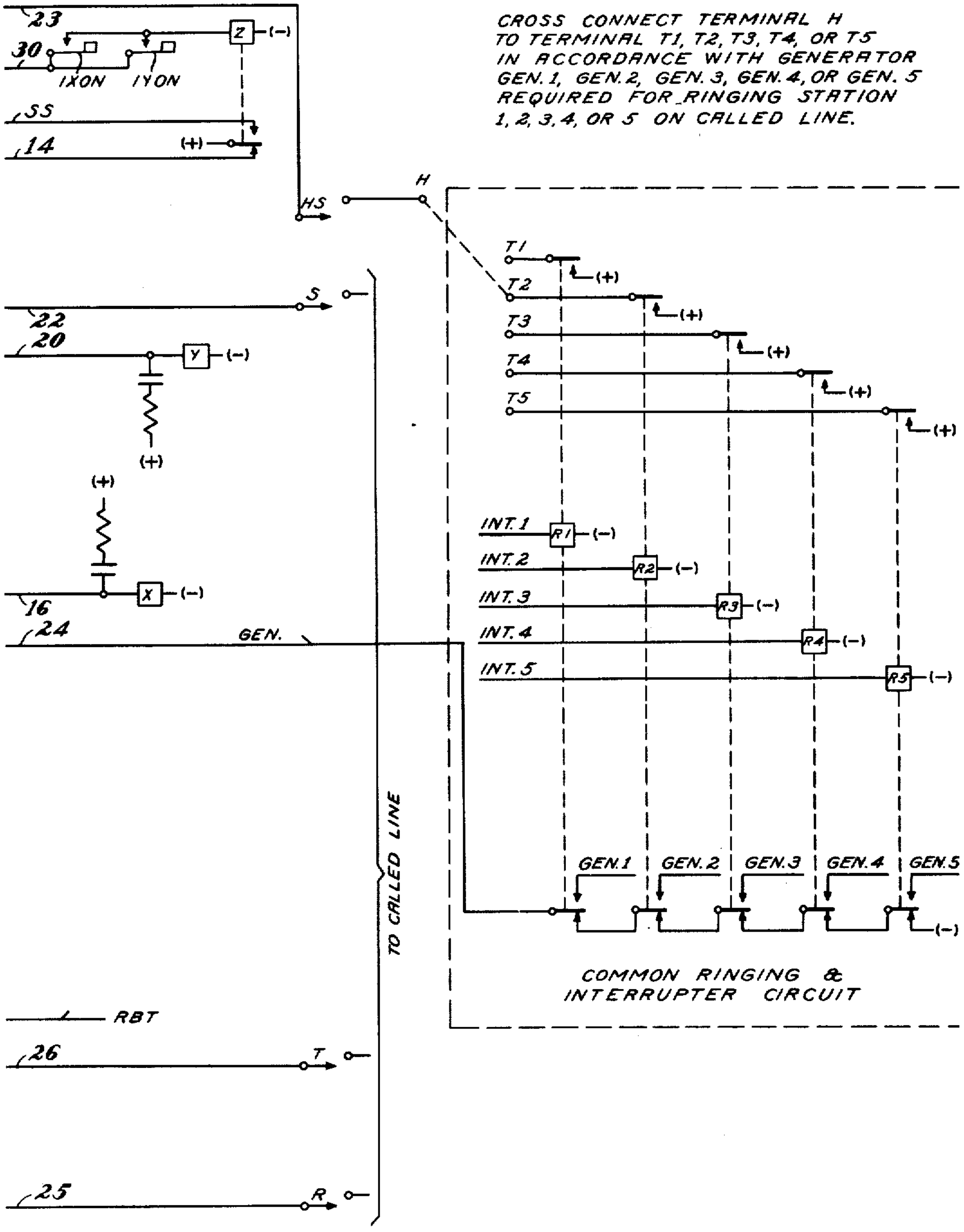
Fig. 5 CONNECTOR
INVENTOR.
GEORGE ELLIOTT
BY Winfred T. Powell
ATTORNEY Patented Nov. 17, 1953 2,659,769

UNITED STATES PATENT OFFICE 2,659,769

TELEPHONE REVERTING CALL SYSTEM

George Elliott, Rochester, N. Y., assignor to Stromberg-Carlson Company, a corporation of New York Application September 30, 1949, Serial No. 118,763

26 Claims. (Cl. 179—17)

The present invention relates to telephone reverting call systems and it more particularly pertains to improved apparatus and circuits for setting up reverting call connections between two substations associated with the same party line.

Two methods of handling reverting calls are extensively used in systems of the automatic type. According to one of these methods, commonly known as the directory number dialling method, the calling subscriber, after dialling the directory number of the called substation, restores the receiver to its supporting hook or cradle and, after waiting a reasonable time, again removes the receiver to complete or prepare the desired connection, depending upon whether or not the call has been answered at the called substation. The other method commonly used in handling reverting calls in automatic systems is that of providing special reverting call switches for selective ringing purposes. In practicing this method the substations associated with the party lines are provided with special numbers. These special numbers must be dialled by calling subscribers in order to set up reverting call connections.

It is an object of the present invention to provide improved apparatus and circuits for establishing reverting call connections between the substations associated with the multi-party lines of a system.

It is another object of the present invention to provide improved reverting call signalling apparatus and circuits in a system not using special reverting call control devices or switches as above mentioned, such system being of the type in which a prefix is added to the regular directory number and then the directory number is dialled, with the call going through selector and connector switches to the called line.

It is still another object of the invention to provide, in a reverting call system of the type mentioned in the immediately preceding paragraph, apparatus and circuits for use in an automatic telephone system of the terminal per station type, particularly such a system as shown in Patent 1,727,133.

Further objects, features and advantages characteristic of the present invention will best be understood by referring to the specification taken in connection with the accompanying drawings in which Figs. 1-5, when arranged in the order named and with correspondingly identified lines in alignment, show the layout (Fig. 1) and the detailed circuits of a sufficient portion of an automatic telephone system to enable one skilled in the art to understand the invention. The novel features will be set forth in the appended claims.

Figure 1:
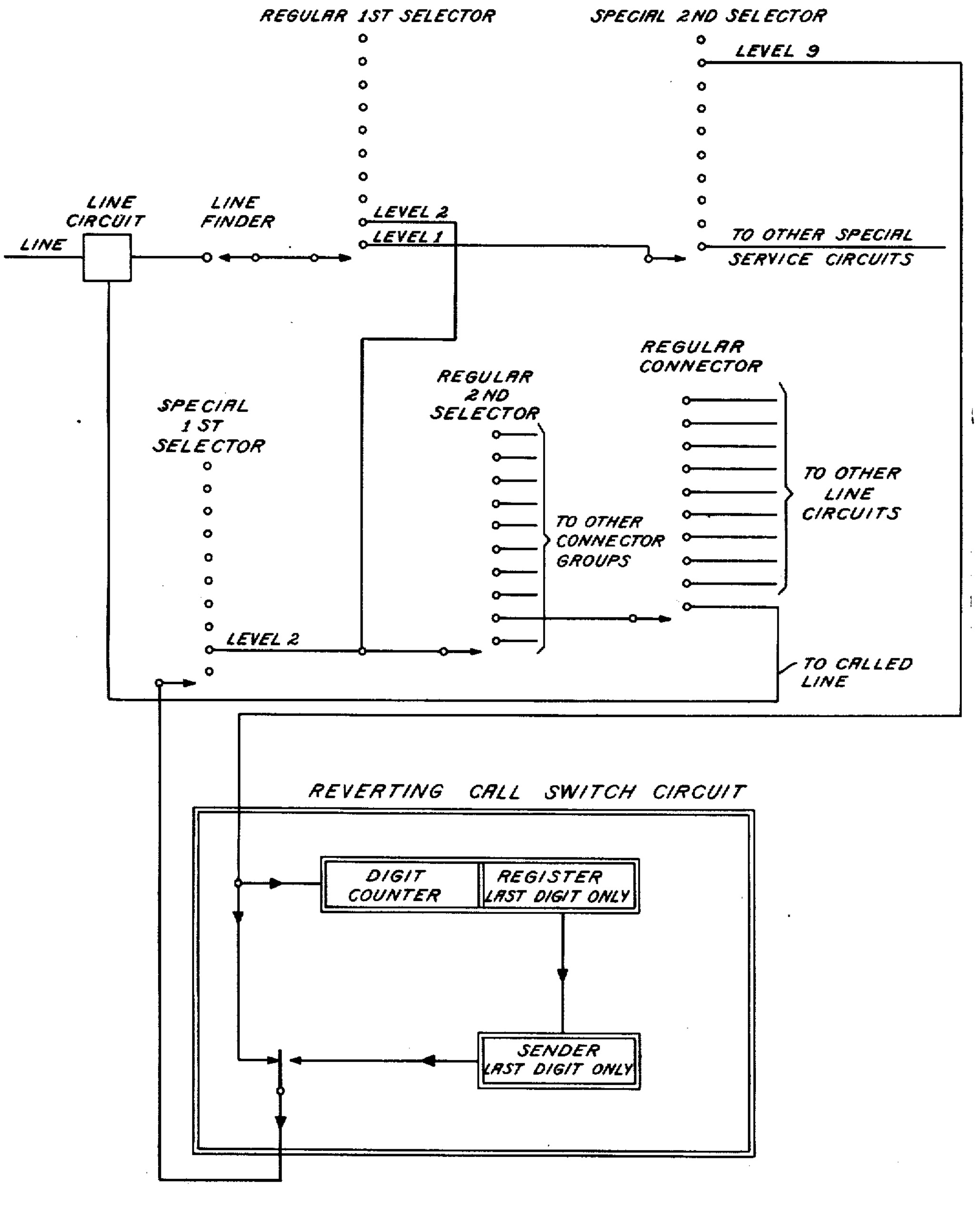

A general description of the arrangement of the various switches and circuits as shown in Fig. 1 will first be given, after which a detailed description of the operation of the system as shown in Figs. 2–5 will be given.

It will be assumed that this is a four digit system, each station having a thousands, a hundreds, a tens and a units digit. It will further be assumed that #19 is the prefix used when setting up a reverting call connection, i. e., the calling party, desiring to establish a connection with another station on the same line, dials #19, then dials the directory number and then hangs up the receiver. The reverting call switch under the control of the calling subscriber on the calling line controls other switches by repeating (during dialling) all but the last digit to the switch train. When the last digit is registered, the calling party hangs up the receiver and this last digit is repeated by the reverting call circuit to the connector used in establishing the connection, the connector seizes the line and rings the selected station. When the call is answered, the reverting call switch, the special first selector and the regular second selector used in this connection are released and may be used by another call. The connector does not release until the parties are through talking and hang up.

Referring to Fig. 1, block diagrams and single line connections are used to illustrate the general layout and operation of the connection extending means of the system. The line terminates on a line circuit having terminals in the banks of line finders (one of which is illustrated), each line finder being permanently associated with a regular first selector as indicated. Level #2 of the regular first selector is illustrated as being connected to regular second selectors, it being understood that other levels of the regular first selector banks will lead to regular second selectors in other groups. Level #2 of the regular second selector banks leads to regular connectors of the second group, it being understood that other levels of the regular second selector banks will lead to other regular connector groups. The banks of the regular connectors lead back to the line circuits in the well known arrangement used in dial telephone systems.

For providing reverting call service in this system, special second selectors are connected to level #1 of the regular first selector circuits. Certain levels of the special second selectors are used for special services, such as calls to toll, information, wire chief and the like, not necessary to be shown for an understanding of the present invention. Each terminal of level #9 of the special second selectors leads to control equipment common to the switches comprising a reverting call switch shown in the block diagram. The detailed circuit operation of this reverting call switch will be described with reference to Figs. 2 and 3.

In setting up a reverting call connection, the calling line is extended to the regular first selector when the call is initiated. When the calling party dials #19 the regular first selector selects the special second selector and the special second selector selects the reverting call switch, after which the regular directory number is dialled. When the first (thousands) digit is dialled certain circuit operations are effective in the reverting call switch and this digit is repeated to the special first selector associated with the reverting call switch. When the second (hundreds) digit is dialled this digit is repeated from the reverting call switch by way of the special first selector to the regular second selector selected in response to the advance of the special first selector to the level determined by the thousands digit, in this example #2. The regular second selector advances to the level determined by the hundreds digit, in this example #2, after which a regular connector is selected for extending the connection to the called line in the called group. When the third (tens) digit is dialled, the connector is advanced to the level determined by the tens digit, in this example level #1. Now when the fourth (units) digit is dialled, this digit is recorded in the reverting call switch circuit but is not repeated to the connector at this time. The calling party will now hear the busy tone, after which the receiver at the calling station is replaced on the switch hook. A sender associated with the reverting call switch now repeats a replica of the units digit to the equipment forward from the reverting call switch which includes the connector used in this connection for making connection with the terminals of the called (and calling) line. The equipment backward from the reverting call switch which includes the line circuit, the line finder, the first selector and the special second selector are released and the line circuit of the calling line is rendered non-busy so that the connector can connect with this line. The connector circuit now rings the called station, after which the receiver is removed at either the called or calling station for setting up the circuits to provide a talking circuit through the connector. This effects the release of the special first selector and the regular second selector and also restores the reverting call switch to normal, ready for use on another call. In this particular example, the connector is of the type in which the release is controlled by the last station to hang up, i. e., it will not release as long as there is a closed circuit across the line to which the connector is connected. Consequently, the connector remains in connection with the line circuit for supplying talking battery to the connection until both the calling and the called parties hang up the receivers, at which time the circuits are restored to normal. In using a connector of this type, i. e., the release operation controlled by the last party to hang up, it is not necessary to use a line circuit of the line lock-out type.

A detailed description of the operation of the system will now be given. When the calling line is extended to the terminals of the reverting call switch, in response to dialling digits 1 and 9, a closed circuit by way of the calling telephone effects the operation of relay CB of Fig. 2. This circuit may be traced from (+), upper winding of relay CB, break contact of relay RC, tip trunk conductor T extending back through the special second selector, the regular first selector, the line finder and the line circuit (not shown), by way of the calling line and substation in series, over the ring side of the line, finder and selector circuits above mentioned to conductor R of Fig. 2 and thence through a break contact of relay RC and the lower winding of relay CB to (—). Relay CB closes a circuit operating relay RD which may be traced from (+), make contact of relay CB and winding of relay RD to (—). The operation of relay CB also closes a circuit across the trunk conductors leading to the first selector associated with the reverting call switch. This circuit may be traced from the tip side of this trunk conductor TS, shown in the lower right-hand portion of Fig. 3 and the lower left-hand portion of Fig. 4, make contact of relay CB, conductor RS1, break contact of relay PL, resistor 3RS and conductor RS to the incoming ring conductor leading to the first selector. The detailed circuits of this first selector, as well as the detailed circuits of the second selector selected by this first selector, are not shown since they may be any of the well known selector circuits. The dashed lines leading in from the lower left hand portion of Fig. 4 to the connector indicate that these corresponding conductors from the reverting call switch are carried through first and second selectors to the selected connector.

The operation of relay RD closes a circuit for operating relay XA extending from (+), lowermost make contact of relay RD, conductor 11, normal contact of the #1 minor switch 1M1ON, conductor 12 and lower winding of relay XA to (—). The closure of the trunk circuit to the first selector operates the associated CB and RD relays (similar to the CB and RD relays of Fig. 2), the latter relay applying (+) to sleeve conductor SS for holding the preceding switches connected to the reverting call switch, since conductor SS leads back through a break contact of relay RC to incoming sleeve conductor S, which in turn extends back to the special second selector.

The reverting call switch is now in condition to receive the first digit of the wanted telephone number, it being understood that it was selected in response to the prefix 19. Since it is assumed that two impulses are transmitted for the thousands digit, the two impulses transmitted from the calling telephone are repeated by relay CB of Fig. 2. Each release of relay CB opens up the circuit to relay RD, but this relay does not release during impulse transmission because of its slow acting characteristics. It might be pointed out at this time that the operation and release of relay XA (the release to be later described) performs no function at this time.

The first release of relay CB at the beginning of the first impulse of the thousands digit closes a circuit for operating relay SH which may be traced from (+), break contact of relay CB, make contact of relay RD and winding of relay SH to (—). The operation of relay SH closes a circuit for energizing stepping magnet 1MX which may be traced from (+), make contact of relay SH, break contact of relay DM, conductor 13 and winding of magnet 1MX to (—). This advances the #1 minor switch from its normal position to its number one off-normal position, the magnet 1MX remaining energized until the release of relay SH at the end of this digit, this latter relay remaining operated until the end of the digit, no matter the number of impulses transmitted. When relay SH releases at the end of the thousands digit, magnet 1MX is de-energized, leaving the #1 minor switch in its #1 off-normal position. When the #1 minor switch is advanced away from its normal position, the above described circuit to the lower winding of relay XA is opened at the off-normal contact 1M1ON for effecting the release of the XA relay.

Each release of relay CB transmits an impulse to the special first selector associated with the reverting call switch by opening up the above described circuit including conductors TS and RS extending to this first selector. Resistor 2RS and condenser C5 are bridged across the lowermost impulse contacts of relay CB for spark absorption purposes. It will thus be seen that this lowermost make contact of relay CB repeats the received impulses to the special first selector for causing this switch to select a regular second selector in the desired group.

Relay CB of the reverting call switch responds to the impulses of the hundreds digit and since it was assumed that there were two impulses in this digit, the lowermost contact of relay CB repeats these two impulses by way of conductors TS and RS for stepping the regular second selector to the second level and for selecting an idle regular connector in the group associated with this level. At the beginning of the hundreds digit transmission by relay CB, the release of this relay again operates relay SH for again energizing magnet 1MX for advancing the #1 minor switch to position 2. Now when relay CB remains energized at the end of the hundreds digit, relay SH releases for de-energizing magnet 1MX, thus leaving the #1 minor switch in position 2.

Figure 2:
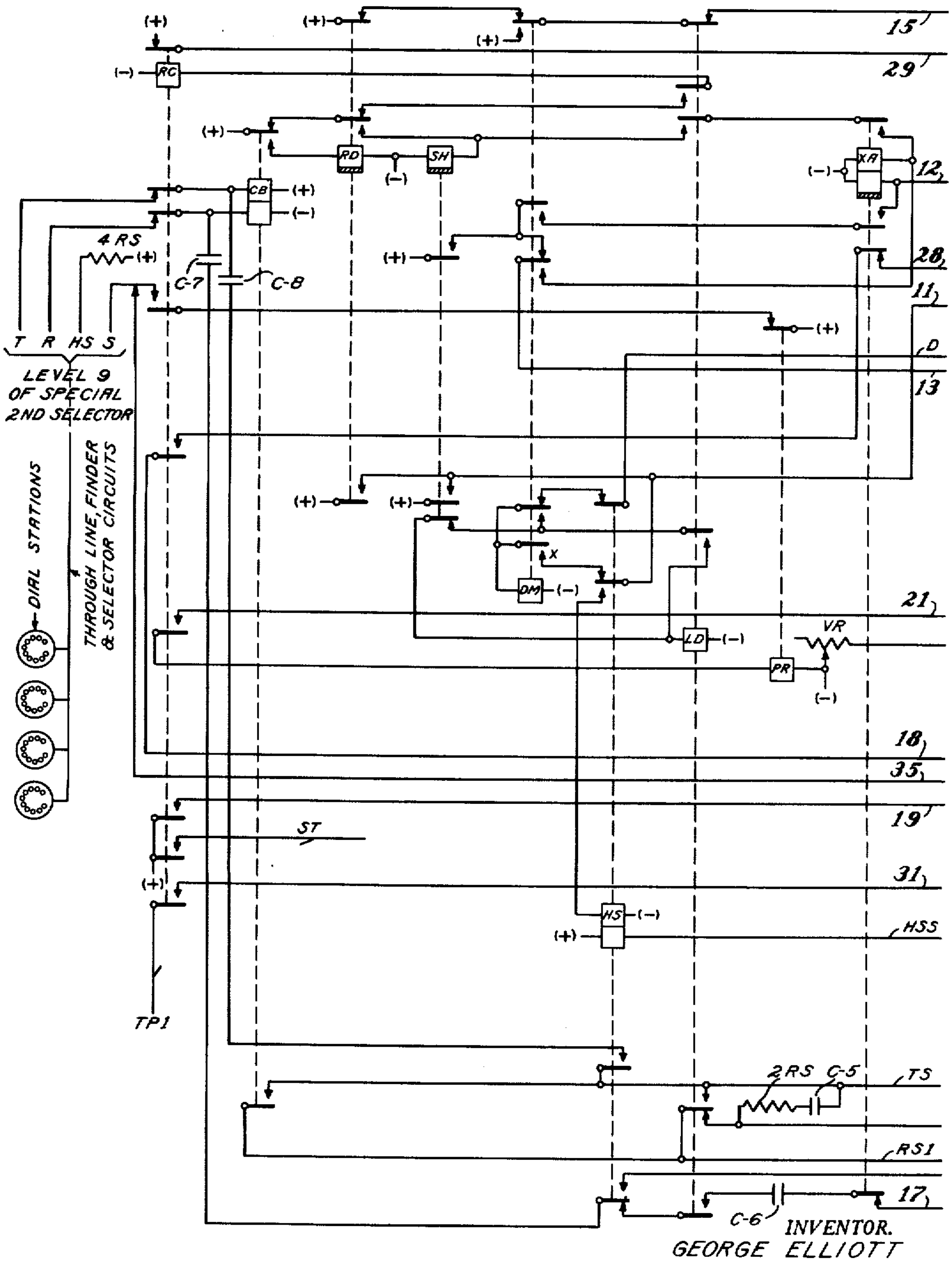
Figure 3:
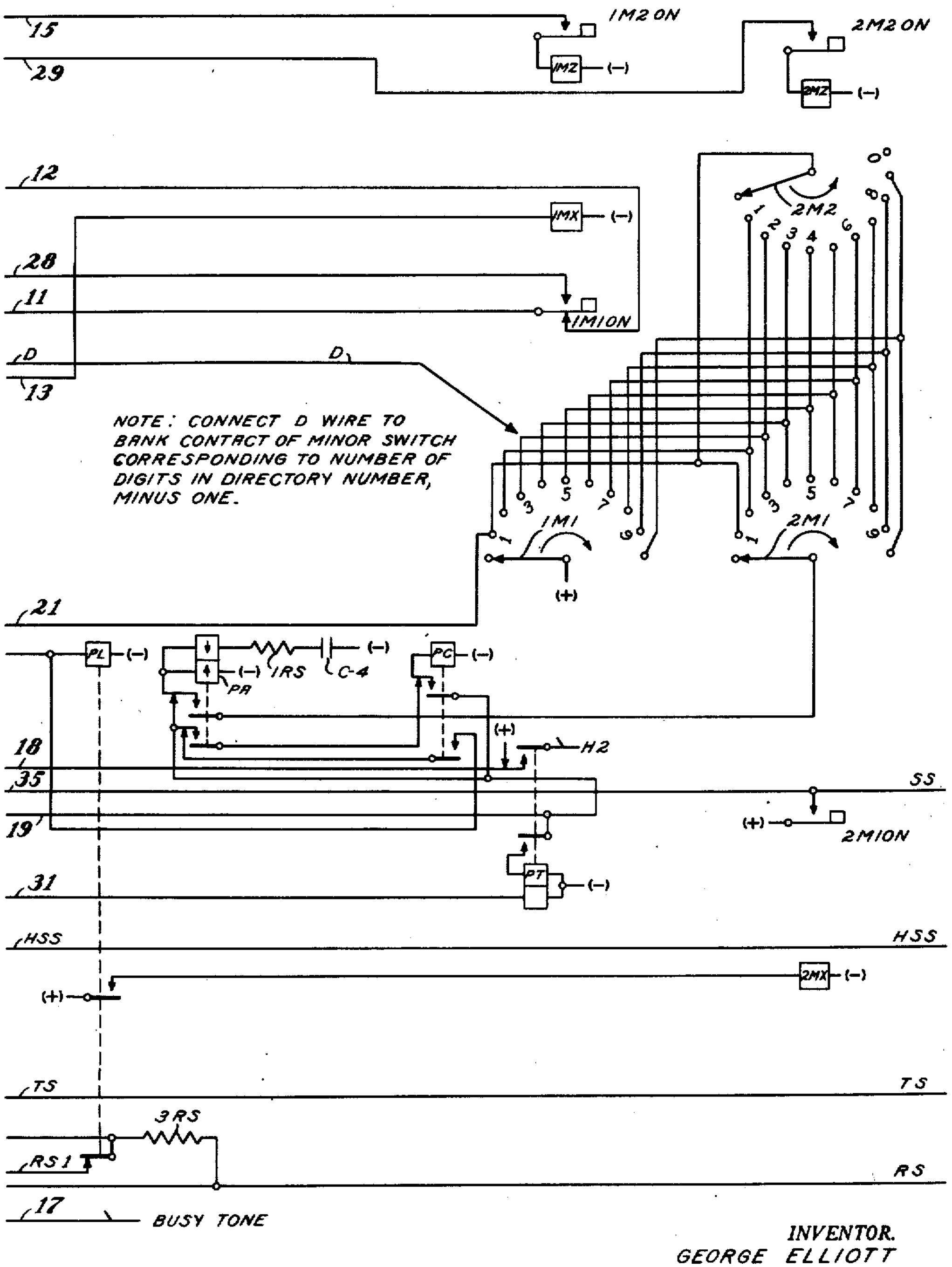

When the circuit is extended through to the selected regular connector, relay CB of this connector (Fig. 4) is operated over a circuit which may be traced from (+), upper winding of relay CB, break contact of relay AB, conductor TS, make contact of relay CB of Fig. 2, conductor RS1, break contact of relay PL, resistor 3RS, conductor RS, break contact of relay AB and lower winding of relay CB to (—). Relay CB closes a circuit for operating relay RD of the connector extending from (+), break contact of release magnet Z, conductor 14, make contact of relay CB and winding of relay RD to (—). Relay RD applies (+) potential to the master ground conductor MG for locking and control purposes as will be later described. Relay XD of the connector is now operated over a circuit extending from (+), make contact of relay RD, break contact of X off-normal spring combination 2XON and the lower winding of relay XD to (—). Relay YD is likewise operated at this time over a circuit extending from (+) on conductor MG, break contact of the Y off-normal spring combination 3YON and lower winding of relay YD to (—). Relay RD applies (+) to incoming sleeve conductor S by way of conductor SS for holding purposes.

In response to the dialing of the tens digit, relay CB is released once and then remains energized, since it was assumed that #1 is the tens digit of the called number. The release of relay CB of the reverting call switch closes the above described circuit for operating relay SH and this relay in turn energizes magnet 1MX over the previously described circuit for advancing the #1 minor switch to position 3. In position 3 a circuit is closed for operating relay DM which may be traced from (+) on the #1 minor switch wiper 1M1, terminal 3 of this wiper, connection and conductor D, break contact of relay HS, break contact and winding of relay DM to (—). Relay DM closes a locking circuit for itself which may be traced from (+), make contact of relay RD, break contact of relay HS, X contact of relay DM (which makes before any other contact is switched on this relay) and winding of relay DM to (—). It will be understood that conductor D is connected to terminal #3 of the #1 minor switch because there are 4 digits in the telephone numbers in this system. If it is a 5-digit system, then this connection would be made to terminal #4 of wiper 1M1 in accordance with the note appearing on the Fig. 3 drawing.

The operation of relay DM closes a circuit for the release magnet 1MZ of the minor switch which may be traced from (+), uppermost make contact of relay DM, break contact of relay LD, conductor 15, off-normal contact 1M2ON and winding of magnet 1MZ to (—). This operates magnet 1MZ for restoring the #1 minor switch to normal, after which the above described circuit to the winding of magnet 1MZ is opened for de-energizing this magnet. When relay DM is operated as above described, the circuit to the winding of magnet 1MX is opened for de-energizing this magnet so that it will not interfere with the release operation of the minor switch. When relay CB remains energized at the end of the tens digit transmission, relay SH is released and a circuit is closed for operating relay LD which may be traced from (+), make contact of relay RD, break contact of relay HS, X contact of relay DM, another make contact of relay DM, break contact of relay SH and winding of relay LD to (—). Relay LD closes a locking circuit for itself which includes the above described operating circuit for this relay but is independent of the break contact of relay SH, thus maintaining relay LD energized when relay SH operates in response to the next digit. When the #1 minor switch is restored to normal, relay XA is again operated over a circuit extending from (+), make contact of relay RD, conductor 11, contact 1M1ON in its normal position, conductor 12 and lower winding of relay XA to (—).

The transmission of the tens digit to the reverting call switch is effective to repeat this digit to the connector by interrupting conductors TS and RS in the previously described manner for advancing the connector to the first level by operating magnet X over a circuit which may be traced from (+), break contact of magnet Z, conductor 14, break contact of relay CB, make contact of relay RD, make contact of relay XD, Y off-normal contact 2YON in its normal position, conductor 16 and winding of magnet X to (—). The condenser and resistor connected to conductor 16 are for spark absorbing purposes. The impulse applied to conductor 16 from the break contact of relay CB energizes the lower winding of relay XD of the connector for locking this relay in its operated position until the end of the tens digit. At the end of this digit the connector switch remains at the level selected, in this example level #1, and relay XD releases.

The units digit is now dialled, it being necessary in connection with this digit to operate the #1 minor switch a number of steps corresponding to the impulses of the digit instead of the previous method of operating the minor switch a number of steps corresponding to the number of digits. Furthermore, the impulses of the units digit transmitted from the calling dial are not repeated to the connector but are stored and re-transmitted at a later time. The release of relay CB at the beginning of the first impulse of the units digit closes the previously described circuit for operating relay SH and this relay remains operated during the units digit transmission and for a short interval of time thereafter. The release of relay CB also closes a circuit for operating the #1 minor switch stepping magnet which may be traced from (+), break contact of relay CB, make contact of relay RD, make contact of relay LD, make contact of relay XA, make contact of relay DM, conductor 13 and winding of magnet 1MX to (—). Since the upper winding of relay XA is connected to this circuit leading to magnet 1MX, relay XA is locked operated and, because of its slow acting characteristics, is not released until the release of relay SH at the end of the units digit. This circuit for holding relay XA energized as long as relay SH is energized may be traced from (+), make contact of relay SH, make contact of relay DM, make contact and lower winding of relay XA to (—). The energization of relay CB at the end of the first impulse opens up and releases magnet 1MX. The remaining impulses of the series (two in this example) are effective to energize magnet 1MX over the previously described circuit for advancing the minor switch to position 3 in response to the 3 impulses of the units digit. During this impulse transmission, the conductors TS and RS are not interrupted because of a closed circuit extending from conductor TS, make contact of relay LD, conductor RS1, break contact of relay PL and resistor 3RS to conductor RS. Consequently, the 3 impulses of the units digit are not repeated by relay CB of the reverting call switch to relay CB of the connector, as were the impulses of the tens digit.

Since the last digit of the wanted telephone number has been transmitted from the calling station and since this is a call back to the called line, it now becomes necessary to give the calling party the busy tone as a signal that the receiver is to be hung up to effect the ringing operation. This busy tone circuit may be traced from the source of busy tone shown in the lower left hand portion of Fig. 3, conductor 17, break contact of relay XA, condenser C6, make contact of relay LD, break contact of relay HS and condenser C7 to the circuit leading back to the calling line.

The receiver at the calling station is now hung up for effecting the release of relay CB of the reverting call switch and this relay in turn opens up and releases the associated RD relay. The release of relay CB closes a momentary circuit by way of the break contact of relay CB, make contact of relay RD, and winding of relay SH to (—) for operating this latter relay, which is released when relay RD releases to open up the above described circuit to the SH relay.

Relay RC of the reverting call switch is now operated over a circuit extending from (+), break contact of relay CB, break contact of relay RD, make contact of relay LD and winding of relay RC to (—). The operation of relay RC disconnects the calling line conductors from the CB relay windings and also from the above described circuit to the busy tone source. The operation of relay RC applies (+) to common start conductor ST for starting the time release apparatus in operation if it is not already operating. The operation of relay RC transfers the above described locking circuits for relays DM and LD from the previously described circuit to (+) at a make contact of relay RD (in multiple with a circuit to (+) at a make contact of relay SH) to (+) extending from a break contact of relay PT, conductor 18, make contact of relay RC, break contact of relay XA, conductor 28, make contact of off normal combination 1M1ON, conductor 11, break contact of relay HS, make contact and winding of relay DM to (—) and make contacts of relays DM and LD to the winding of the LD relay. It will be noted that this substitute locking circuit to (+) at the break contact of relay PT is closed before the release of relay SH. Consequently, this momentary operation of relay SH serves to maintain (+) on the locking circuits for the DM and LD relays until well after the substitute (+) is provided. The operation of relay RC also connects time pulse conductor TP1 to the winding of the PT relay for time release purposes, which will be later described.

The operation of relay RC starts the operation of pulse relay PA. The circuit for energizing relay PA may be traced from (+), make contact of relay RC, conductor 19, break contact and lower winding of relay PA to (—). At the same time that the lower winding of relay PA is energized over this circuit, the upper winding is also energized in series with resistor 1RS and condenser C4 to (—). The two windings of relay PA are differentially connected so that during the time that the charging current is flowing into condenser C4, this current prevents the operation of the PA relay until a point is reached on the condenser charging cycle where there is insufficient current flow in the upper winding of the relay to prevent its energization by means of the current in its lower winding. The effect of this is to render relay PA slow to operate. The operation of relay PA opens up the above described circuit to both windings of this relay for effecting its release. It will be slow to release however because of the discharge current from condenser C4 flowing through both windings of the relay in series aiding relation. When relay PA is released, the above described operating circuit for this relay is again closed and when the relay again operates, this circuit is opened for effecting the release of the relay. This provides a self interrupting circuit for the PA relay for causing it to operate and release at a rate for proper impulse transmission to the connector by means of a circuit which will now be described.

The first operation of relay PA closes a circuit for operating relay PC which may be traced from (+), make contact of relay RC, conductor 19, make contact of relay PA, break contact and winding of relay PC to (—). Relay PC locks itself operated to (+) on conductor 19. After relay PC is operated, the release of relay PA closes a circuit for operating pulse repeating relay PL which may be traced from (+), make contact of relay RC, conductor 19, break contact of relay PA, make contact of relay PC and winding of relay PL to (—). The operation of relay PA opens up this circuit to the PL relay for effecting its release, consequently relay PL follows the operation of the PA relay, being operated by the release of relay PA and released by the operation of relay PA. Variable resistor VR is connected across the winding of relay PL to provide proper timing of this relay.

Each operation of relay PL closes a circuit for operating the #2 minor switch stepping magnet extending from (+), make contact of relay PL and winding of magnet 2MX to (—). Consequently, the #2 minor switch will be stepped in response to the PL relay operation. Furthermore, each operation of relay PL opens up the above described circuit including conductors TS and RS and, since relay CB of the reverting call switch is released at this time, the TS and RS conductors will be pulsed for effecting the operation of relay CB of the connector in accordance with the impulses transmitted by the PL relay of the reverting call switch.

Referring to the connector, each release of relay CB closes a circuit for operating the connector in its Y or secondary direction, this circuit being traced from (+), break contact of magnet Z, conductor 14, break contact of relay CB, make contact of relay RD, break contact of relay XD, make contact of relay YD, conductor 20 and winding of magnet Y to (—). The condenser and resistor connected to conductor 20 are for spark absorbing purposes. Conductor 20 is connected to the upper winding of relay YD so that this relay will remain locked operated during this impulse transmission after its lower winding is opened by the opening of contact 3YON in response to the switch taking its first Y step. At the end of the retransmission of the units impulses to the connector switch, relay CB will remain energized long enough to permit the release of relay YD.

Referring back to the general description of the operation of the system, it will be recalled that it is necessary to release the line circuit, the finder circuit, the regular first selector, and the special second selector during the re-transmission of the units digit in order to allow the connector to find the called line idle. This is accomplished by operating relay PR of the reverting call switch when the #2 minor switch reaches the position next in advance of the position to which it is advanced by the impulses of the units digit. In this example, this will mean that this relay operation must be effected when the #2 minor switch reaches position 2, since the #1 minor switch is in position 3, set in this position by the 3 impulses of the units digit. A circuit is closed when the #2 minor switch reaches position 2 for operating relay PR of the reverting call switch, this circuit being traced from (+), #1 minor switch wiper 1M1 in position 3, #2 minor switch wiper 2M2 in position 2, conductor 21, make contact of relay RC and winding of relay PR to (—). The operation of relay PR disconnects (+) from the circuit leading back to the incoming sleeve conductor S, including the make contact of relay RC, for effecting the release of the line circuit, the line finder, the regular first selector and the special second selector, since these circuits are maintained in their operated positions by the presence of (+) on sleeve conductor S in the well known manner. Now when the #2 minor switch steps from position 2 into position 3, the above described circuit to the PR relay is opened for effecting the release of this relay. The release of relay PR again applies (+) to the incoming sleeve conductor of the reverting call switch to make this switch test busy to other calls. It will thus be seen that (+) is removed from incoming conductor S for only a short time, which is long enough to release the preceding switches, after which the reverting call switch is protected against seizure. Since the receiver has been hung up on the called line, the line circuit is in normal condition so that the connector can seize and ring this line in a manner which will now be described.

One of the functions of the relay BT is next explained. It will be noted that the sleeve wiper of the connector, during the time that relay YD is operated, is extended by way of conductor 22, make contact on relay YD and break contact of relay SW to the winding of the BT relay. Consequently, the winding of the BT relay is connected to the sleeve terminal of the called line with which the wiper S of the connector is brought into contact during the interval that relay YD remains operated after the stepping operation of the connector in the Y direction has been completed. The relay BT is used at this time to detect the presence of busy indicating (+) potential on the called line sleeve terminal.

In the event that the called line is found busy, relay BT operates over the above described circuit which is closed only so long as the YD relay is held operated (during and following the completion of the stepping operation of the connector in the Y direction). When relay YD releases, a locking circuit for relay BT is completed over the following circuit: (—), the winding of relay BT, break contacts of relay SW, the break portion of the make-before-break contacts of relay YD, make contacts of relay BT, make contacts of relay RD to (+). Thus, as a result of detecting a busy condition, relay BT is operated and locked until the connector is released by the calling subscriber, at which time the above-described locking circuit is opened by the release of relay RD. During the time that relay BT is locked, the operating circuit of relay SW is opened at break contacts on relay BT and a circuit is completed to connect busy tone to the calling subscriber's station over the following circuit: one of the output leads of the common busy tone source (the other of which is grounded), the common busy tone wire, break contacts on relay YD, make contacts on relay BT, break contacts on relay SW, the upper winding of relay AB, condenser C1, the calling subscriber's loop, the lower winding of relay CB through the 48 volt battery to the grounded busy tone source lead.

Returning to the description, of the connection extended from the reverting call switch, when the called line is reached by the connector switch (third step in this example) the called line will not be busy because it was cleared out, as previously described, when the #2 minor switch took its second step, the next step preceding that which selects the called line. Therefore, the called line will test idle and when relay YD releases at the end of the units digit transmission, the BT relay will not be operated and the sleeve wiper is disconnected from the BT relay and connected to the upper winding of the SW relay. This latter relay will now operate over a circuit extending from (+), make contact of relay RD, break contact of relay BT, upper winding of relay SW, break contact of relay YD, conductor 22, wiper S and associated terminal and winding of the cut off relay of the idle called line to (—). Relay SW closes a locking circuit for itself which may be traced from (+) on conductor MG, X contact and lower winding of relay SW (−). Sleeve wiper S is now connected to (+) for making the called line busy and for operating the cut off relay of this line, this circuit extending from (+), make contact of relay SW, conductor 22 and wiper S to the sleeve of the called line.

When three impulses have been transmitted to the connector by the PL relay of the reverting call switch, which relay is controlled by the intermittent operation of relay PA, it is necessary to stop the impulse transmission because this corresponds to the number of impulses received for the units digit. This is done by locking relay PA operated, when this relay operates with the #2 minor switch in position 3 in correspondence with the #1 minor switch in position 3. This locking circuit may be traced from (+), wiper 1M1 of the #1 minor switch in position 3, wiper 2M1 of the #2 minor switch in position 3, make contact and lower winding of relay PA to (−). Since relay PA is locked operated, relay PL cannot again operate after it is released by the operation of the PA relay because its operating circuit is open at the lowermost break contact of the PA relay. This leaves the #1 and #2 minor switches in position 3 where they remain until the call is answered to terminate the ringing of the called station.

Ringing of the called bell is effected over a circuit which will now be described. With relay SW operated, (+) potential is applied from one of the common ringing interrupter relays R1–R5 by way of jumper connection H, ringing control terminal and wiper HS of the connector switch, conductor 23, break contact of relay RT, make contact of relay SW and winding of relay BT to (−). Thus, relay BT operates as a ringing relay, in addition to the function previously described, and is used to connect ringing current to the called line during any one of the five ringing intervals by the presence of the ringing control ground on wiper HS as determined by the jumper connection of terminal H. Therefore, the ringing control terminal H of the individual line selected by the connector can be cross connected to effect the operation of relay BT of the connector at any one of these five ringing intervals for selecting any one of the five generator sources by extending the circuit from the generator source back by way of common generator conductor GEN, conductor 24, make contact of relay BT, upper winding of relay RT, break contact of relay TL, break contact of relay RT, make contact of relay SW, conductor 25, ring wiper R and terminal of the connector switch, called line and substation in series, tip terminal and wiper T of the connector switch, conductor 26, make contact of relay SW and break contact of relay RT to (+). By this arrangement (shown in the above mentioned Patent Number 1,727,133), terminal per station operation may be provided so that a station may be moved from one line to another without changing the station number if there is a vacancy on the line to which the station is moved having the same frequency or code as the station to be moved. This is because the T, R and S terminals of the connector, associated with any line, can be cross connected to any other line and the HS terminal can be cross connected to any frequency or code.

In response to the answering of the call by the called party, or in response to the removal of the receiver by the calling party, relay RT will be operated over a circuit including the closed path of the called line. This circuit will include the common generator conductor if the call is answered during the ringing interval (with relay BT operated) and will include the circuit to (−) by way of break contact of relay BT and make contact of relay RD if the call is answered during the silent interval.

The operation of relay RT closes a locking circuit for itself extending from (+) on conductor MG, break contact of relay TL, X make contact of relay RT, make contact of the continuity spring combination and lower winding of relay RT to (−). This extends the line circuit through make contacts of relay SW and make contacts of relay RT to the windings of the AB relay to (−) and (+), the latter circuit to (+) extending through a make contact of relay SW. Relay AB operates and closes a circuit for operating relay AA extending from (+), make contact of relay AB, make contact of relay SW and winding of relay AA to (−). It might be pointed out at this time that the ring back tone circuit extending from common conductor RBT, located in the lower left hand portion of Fig. 5, by way of condensers C3 and C2 to the calling line serves no purpose in a call of this class because the calling party has the receiver on the switch hook during this ringing operation. This RBT circuit is for use on a regular, instead of a reverting call. Likewise, talking condensers C1 and C2 are only used on a regular call.

The operation of relay AA closes a circuit for operating relay HS of the reverting call switch which may be traced from (+), lower winding of relay HS, conductor HSS, lower winding of relay TL, make contact of relay AA and make contact of relay RD to (−). Relay TL is not operated over this circuit because both of its windings are energized in opposition. Relay HS closes a locking circuit for itself extending from (+), break contact of relay PT, conductor 18, make contact of relay RC, break contact of relay XA, conductor 28, off normal contact 1M1ON, conductor 11, make contact and upper winding of relay HS to (−). The operation of relay HS opens up the above described locking circuits for relays DM and LD for effecting the release of these relays. The release of relay LD opens up and releases relay RC and this latter relay transfers the incoming sleeve conductor to conductor SS and (+) at the make contact of relay RD of the connector for maintaining the reverting call switch busy until the release of the RD relay of the connector.

The release of relay LD closes a circuit for operating magnet 1MZ for releasing the #1 minor switch and when this switch reaches its normal position magnet 1MZ is de-energized. This release circuit may be traced from (+), break contacts in series of relays RD, DM and LD, conductor 15, contact 1M2ON and winding of magnet 1MZ to (−). The release of relay RC closes a similar circuit for releasing the #2 minor switch by energizing magnet 2MZ by way of conductor 29.

The release of relay RC also effects the release of relay PC by disconnecting (+) from conductor 19 over which relay PC was locked operated. When the #1 minor switch wiper 1M1 leaves position 3 in response to the release operation, the above described locking circuit for relay PA is opened for effecting the release of this relay. The release of relay LD opens up the bridge across conductors TS and RS for effecting the release of relay CB of the connector, which in turn opens up and releases its associated RD relay. The release of relay RD disconnects (—) from the above described circuit to the lower winding of relay HS for effecting the release of this relay, its upper winding being de-energized by the release of relay RC. With relay RD of the connector released and with the #2 minor switch of the reverting call circuit in its normal condition, (+) is removed from conductor SS for removing this potential from incoming sleeve conductor S, thus rendering the reverting call circuit selectable for another connection. Relay XD of the connector is operated by the release of relay RD over a circuit which may be traced from (+), break contact of relay RD, make contact of relay BT (held energized after the ringing period over a circuit that will next be described) and upper winding of relay XD to (—). It will thus be seen that the release of relay RD of the connector disconnects (+) from the sleeve conductor SS for effecting the release of the regular second selector and the special first selector used in connection with this call. Then when relay XD operates shortly thereafter, as just explained, the SS terminal associated with this connector in the second selector banks is connected to (+) over a circuit extending from (+), make contact of relay BT, make contact of relay XD and conductor SS, thus guarding this connector against seizure until it is released. The circuit for operating relay BT after the ringing period may be traced from (+), make contact of relay AB, make contact of relay RT, make contact of relay SW and winding of relay BT to (—).

Talking current is now fed to the line circuit by way of the windings of the AB relay. When both parties on the line hang up, relay AB is released for opening up and releasing relay AA. The release of relay AB also opens up the above described circuit for relay BT for effecting the release of this relay. The release of relay BT momentarily removes (+) from conductor SS leading to the connector, but this conductor is again connected to (+) by the operation of the connector release magnet. The release magnet is operated over a circuit which may be traced from (+), break contact of relay RD, break contact of relay SW, conductor 30, X and Y off normal contacts 1XON and 1YON and winding of magnet Z to (—). The operation of magnet Z applies (+) to conductor SS until the switch is restored to normal and magnet Z is released by the opening of the off normal contacts. The release of relay AA disconnects (+) from master ground conductor MG (this conductor being connected to (+) when relay AA was operated to prevent the release of the SW, the RT and the XD relays) for de-energizing the above described locking circuits for relays SW and RT, thus effecting the release of these relays. The release of relay BT opens up the above described circuit for the upper winding of relay XD for effecting the release of this relay. This places the connector circuit in normal condition ready for use on another call.

The time release feature of the reverting call circuit will now be explained. With relay RC operated when the calling party hangs up the receiver as previously described, a pulse on common conductor TP1 at the beginning of the time out period will be extended through a make contact of relay RC and conductor 31 to the lower winding of relay PT for operating and locking this relay to (+) on conductor 19, this (+) being maintained on conductor 19 as long as the RC relay is operated. This operation of relay PT switches conductor 18 (which is holding relays DM and LD operated by way of conductors 28 and 11) from direct (+) to common hold conductor H2, this latter conductor being connected to (+) at the time that conductor TP1 is pulsed and for a comparatively long time interval thereafter. This comparatively long time interval is that which will control the release of the circuits at the end thereof, if these circuits have not been normally released as previously described. In other words, if the circuits are not normally released within this comparatively long time interval, (+) is removed from conductor H2 for effecting the release of the DM and LD relays, which in turn effects the release of the RC relay for releasing the connection in the previously described manner. Since this feature is not a part of the present invention, but is only incidental thereto, the common apparatus for controlling the energization of conductors TP1 and H2 will not be shown or described.

Condensers C7 and C8 connected to the windings of the CB relay of the reverting call switch are for the purpose of providing a capacitive circuit from the switches ahead to give the calling party a busy tone in the event that the first or second selector runs into an "all trunks busy" condition. Resistor 4RS connected to conductor HS incoming to the reverting call switch is for a purpose which will now be explained, but which has no bearing on the present invention. In case a switch handling a call from a manual position should inadvertently land on this reverting call circuit, this connection to (+) through resistor 4RS prevents the operation of certain means in the trunk or cord circuits and the consequent false transmission of answering supervision. Since this feature is only related to the operation of a trunk call which has no part of the reverting call operation, it will not be shown or explained in detail. In other words, the 4RS resistor and the circuit is not related to any part of the normal circuit operation of the reverting call system.

Relay TL of the connector is also in a circuit not used in connection with reverting calls. This relay is used to mark a regular call (not a reverting call) through the connector from a toll position, it not being necessary to describe this feature for an understanding of the present invention.

Figure 4:
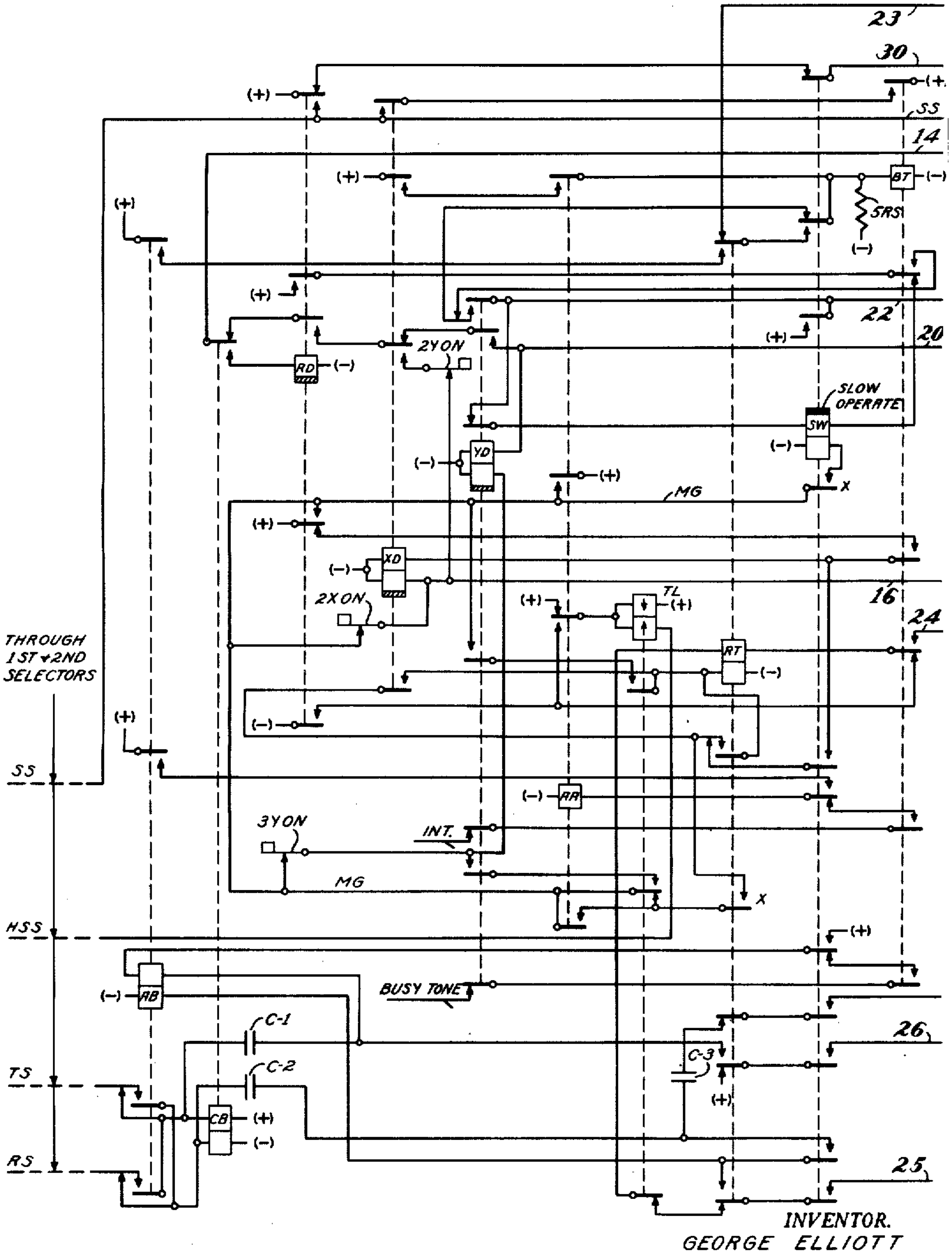

The circuit from the common interrupter conductor INT of Fig. 4 leading to the winding of the AA relay likewise does not function in connection with a reverting call, but is for the purpose of providing a flash busy signal to a manual position when a busy line is called from this position. This flash signal is sent back over the HSS conductor by intermittently switching this conductor from (+) to (—).

While there has been described what is at present considered to be the preferred embodiment of the invention, it will be understood that various modifications may be made therein without departing from the spirit of the invention as intended to fall within the true scope of the appended claims.

What I claim is:

1. In an automatic telephone system, a party line, a calling station and a called station on said line, a reverting call device, one or more selector switches, a connector switch, means responsive to the digital impulses of a predetermined digit or digits received from said calling station for setting said selector switch or switches to select said reverting call device, means in said reverting call device responsive to a portion of the digital impulses of the directory number of said called station received from said calling station for repeating said portion of the received impulses to extend a connection from said reverting call device to said connector switch, and further means in said reverting call device responsive to the remainder of the digital impulses of said directory number for storing the last mentioned impulses for subsequent transmission of a replica of said stored impulses to said connector switch.

2. In an automatic telephone system, a party line, a calling station and a called station on said line, a reverting call device, one or more selector switches, a connector switch, means responsive to the digital impulses of a predetermined digit or digits received from said calling station for setting said selector switch or switches to select said reverting call device, means in said reverting call device responsive to a portion of the digital impulses of the directory number of said called station received from said calling station for repeating said portion of the received impulses to extend a connection from said reverting call device to said connector switch, and further means in said reverting call device responsive to the remainder of the digital impulses of said directory number for storing the last mentioned impulses, and means in said reverting call device controlled by said calling station for transmitting a replica of said stored impulses to said connector switch and causing said connector switch to connect with said line and ring said called station.

3. In a telephone system, lines, one or more automatic switches, a reverting call device, means including a calling line for directively setting said automatic switch or switches to extend a connection from any one of said lines to said reverting call device, one or more additional automatic switches, a connector switch, means controlled over said calling line for directively setting said additional switch or switches to extend a connection from said reverting call device to said connector switch, and means in said reverting call device controlled over said calling line for controlling in the direction backward from said reverting call device said first mentioned switch or switches and controlling in the direction forward from said reverting call device said second mentioned switch or switches to effect seizure of said calling line by said connector.

4. In a telephone system, a plurality of lines, a connector switch for calling a called line, a reverting call switch, means responsive to a plurality of digital impulses transmitted from a calling station on one of said lines for causing said connector switch to signal a station on said called line, and means controlled by said reverting call switch for holding said connector switch in connection with said called line when said calling station receiver is replaced on its switch hook.

5. In a telephone system, a connector switch, a dual purpose busy and ringing relay in said switch having contacts for connecting busy tone current to a calling line connected to said connector switch when said switch is calling a busy line or ringing current to a called line when said switch is calling an idle line, means for operating and locking said relay when said connector switch calls a busy called line, and means for intermittently operating said relay when said connector switch calls an idle called line.

6. In a telephone system, party lines, automatic switches including a final selector, a reverting call switch, means including said reverting call switch effective on reverting calls between a calling and a called subscriber on one of said party lines for establishing a connection from said reverting call switch to said called subscriber through said automatic switches, means responsive to the establishing of said connection for ringing said called subscriber, and means responsive to either subscriber answering said ringing for releasing said reverting call switch and all of said automatic switches except said final selector.

7. In a telephone system, party lines, automatic switches including a final selector, a reverting call switch, means including said reverting call switch effective on reverting calls between a calling and a called subscriber on one of said party lines for establishing a connection from said reverting call switch to said called subscriber through said automatic switches, means responsive to the establishing of said connection for ringing said called subscriber, means responsive to either subscriber answering said ringing for releasing said reverting call switch and all of said automatic switches except said final selector, and means controlled in response to both but not one of said calling or called subscribers replacing the receiver for releasing said final selector.

8. In a telephone system, a plurality of subscribers' lines, a plurality of stations permanently connected to a called one of said lines, a connector switch, a reverting call control circuit, line selecting and signaling means associated with said connector switch, means controlled from a first calling station on a calling line for transmitting a plurality of digital impulses in accordance with the directory number of a called station on said called line, means including said connector responsive to said plurality of digital impulses transmitted from said plurality of first calling station for extending a connection to said called line and for signaling said called station, means controlled from a second calling station on said called line for transmitting said plurality of digital impulses in accordance with said directory number, means including said connector responsive to said plurality of digital impulses transmitted from said second calling station for preventing said extension of said connection and for preventing said signaling of said called station, and means controlled by said reverting call control circuit for cancelling said last mentioned preventing means.

9. In a telephone system, a plurality of subscribers' lines, a plurality of stations permanently connected to a called one of said lines, a connector switch, a reverting call control circuit, line selecting and signaling means associated with said connector switch, means controlled from a first calling station on a calling line or from a second calling station on said called line for transmitting digital impulses in accordance with the directory number of a called station on said called line, means including said connector responsive to said digital impulses transmitted from said first station for extending a connection to said called line and for signaling said called station, means including said connector responsive to said digital impulses transmitted from said second station for preventing said extension of said connection and for preventing said signaling of said called station, and means controlled by said reverting call control circuit responsive to prefix digital impulses and said directory number impulses for canceling said last mentioned preventing means.

10. In an automatic telephone system, a connector, a plurality of lines accessible from said connector, a reverting call control device, a plurality of sources of signaling currents, a ringing control terminal specific to each of said lines for controlling the application of any one of said sources of signalling current to the line associated with said terminal, a wiper of said connector connecting with a specific terminal when a line corresponding to this terminal is connected to by said connector, relay mechanism operative to prepare a signaling current path to the connected line, means controlled over said specific terminal of the connected line to operate said relay mechanism in response to the termination of the final digit of the directory number associated with said connected line, and means controlled by said reverting call control device for transmitting said final digit to said connector.

11. In a telephone system, a plurality of party lines, a calling terminal for each of said lines, a reverting call switch common to said lines, connection extending means for extending a connection from a calling one of said lines to said reverting call switch, a connector switch, means controlled by the calling party on said calling line for causing said reverting call switch to set up a reverting call connection to said calling line via said connector switch, means including said reverting call switch operated by the replacement of the receiver by said calling party for causing said connector switch to apply ringing current to said called line indicative of the called station thereon, and means actuated by the response of said called station for cutting off the ringing current and for restoring said reverting call switch to common use for other calls.

12. In a telephone system, a plurality of party lines, a calling terminal for each of said lines, a reverting call switch common to said lines, first connection extending means for extending a connection from a calling one of said lines to said reverting call switch, second connection extending means including a connector switch, means controlled by the calling party on said calling line for causing said reverting call switch to set up a reverting call connection to said calling line via said second connection extending means, means including said reverting call switch operated by the replacement of the receiver by said calling party for causing said connector switch to apply ringing current to said called line indicative of the called station thereon, and means actuated by the response of said called station for cutting off the ringing current and for restoring said reverting call switch and said second connection extending means except for said connector switch to common use for other calls.

13. In a telephone system, party lines, a connector switch, a reverting call device, means exclusive of said reverting call device for extending a first connection from a calling station on one of said party lines to said connector switch, means including said reverting call device for extending a second connection from said calling station to said connector switch, means in said connector operative during said first connection for preventing the extension of said first connection by way of said connector switch to said one of said party lines, and means in said connector operative during said second connection for permitting the extension of said second connection by way of said connector switch to said one of said party lines.

14. In an automatic telephone system, a plurality of party lines, links common to said lines, switching equipment arranged to connect any one of said links individually to any one of said lines, control equipment common to said lines and said links, means for connecting a calling one of said lines to said control equipment, means controlled from a calling station over said calling line for causing said common control equipment to operate said switching equipment to link a connection between said switching equipment and said calling line, digit storage means in said common control equipment operable over said calling line to store digital information indicative of the designation of a desired called station on said calling line, means controlled by said common control equipment in accordance with said stored digital information for operating said switching equipment to connect to said calling line, and means controlled by said common control equipment in accordance with said stored digital information to select the proper characteristic signal for signaling the desired station on said calling line.

15. In a reverting call switch circuit, a first switch and a second switch in said reverting call switch circuit, means for connecting a calling station on a calling line to said reverting call switch circuit, means controlled in response to the dialing of the digital impulses of a directory number of a called station on said calling line for operating an impulse repeating relay in said reverting call switch circuit in accordance with said digital impulses, means controlled by said impulse repeating relay in response to certain series of said digital impulses for advancing a connector switch to a level associated with said calling line and for operating said first switch one step for each series of digital impulses, means for operating said second switch one step for each impulse of the last series of said digital impulses, and means controlled in accordance with the number of steps taken by said second switch for advancing said connector switch to said calling line.

16. In a reverting call switch circuit, a first switch and a second switch in said reverting call switch circuit, means for connecting a calling station on a calling line to said reverting call switch circuit, means controlled in response to the dialing of the digital impulses of a directory number of a called station on said calling line for operating an impulse repeating relay in said reverting call switch circuit in accordance with said digital impulses, means controlled by said impulse repeating relay in response to all the series of said digital impulses except the last for advancing a connector switch to a level associated with said calling line and for operating said first switch one step for each series of digital impulses, means for operating said second switch one step for each impulse of the last series of said digital impulses, an impulse repeating device, and means controlled by said impulse repeating device in accordance with the number of steps taken by said second switch for advancing said connector switch to said calling line.

17. In an automatic telephone system, a connector, a plurality of lines accesible from said connector, a reverting call control device operative to respond to digital impulses of a regular directory number of one of said lines, a plurality of sources of signaling currents, a ringing control terminal specific to each of said lines for controlling the application of any one of said sources of signaling current to the line associated with said terminal, a wiper of said connector connecting with a specific terminal when a line corresponding to this terminal thereto is connected to by said connector, relay mechanism operative to prepare a signaling current path to the connected line, means controlled over said specific terminal of the connected line to operate said relay mechanism in response to the termination of the final digit of the directory number associated with said connected line, and means controlled by said reverting call control device for transmitting said final digit to said connector.

18. In an automatic telephone system, a multiparty line, ringing apparatus operative to provide ringing signals having different station indicating characteristics individually corresponding to the substations associated with said multi-party line, a reverting call switch circuit, automatic switching apparatus controllable over said multi-party line from a calling substation thereon to route a connection to said reverting call switch circuit, means in said reverting call switch circuit responsive to the dialing of the directory number assigned to a called substation on said multi-party line for repeating the digits corresponding to said directory number to automatic switching apparatus for setting up a connection to said multiparty line, and means controlled from said reverting call switch circuit for releasing a portion of said connection and for rendering said multiparty line idle to permit the application of one of said ringing signals thereto.

19. In an automatic telephone system, a multiparty line, ringing apparatus operative to provide ringing signals having different station indicating characteristics individually corresponding to the substations associated with said multiparty line, a reverting call switch circuit, means for extending a connection from a calling substation on said multi-party line to said reverting call switch circuit, means in said reverting call circuit responsive to the dialing of the directory number assigned to a called substation on said multi-party line for repeating the digits corresponding to said directory number to automatic switching apparatus for setting up a connection to said multi-party line, and means controlled from said reverting call switch circuit for releasing a portion of said connection and for rendering said multi-party line idle to permit tthe application of one of said ringing signals thereto.

20. In an automatic telephone system, a multiparty line, ringing apparatus operative to provide ringing signals having different station indicating characteristics individually corresponding to the substations associated with said multiparty line, a reverting call switch circuit, means for extending a connection from a calling substation on said multi-party line to said reverting call switch circuit, means in said reverting call switch circuit responsive to the dialing of the directory number assigned to a called substation on said multi-party line for repeating the digits corresponding to said directory number to a selector and a connector for setting up a connection to said multi-party line, and means controlled from said reverting call switch circuit for releasing said selector and for rendering said multi-party line idle to permit said connector to connect to said multi-party line and apply one of said signals thereto which individually corresponds to said called substation.

21. In a reverting call system, a reverting call switch circuit, a series of switches comprising a switch train, a first switch and a second switch in said reverting call switch circuit, means for connecting a calling station on a calling line to said reverting call switch circuit, means controlled in response to the dialing of the series of impulses of a directory number of a called station on said calling line for operating an impulse repeating relay in accordance with said impulses, means controlled by said impulse repeating relay in response to a portion of said series of impulses for advancing a portion of said switch train towards said calling line and for operating said first switch one step for each series of said portion of the series of impulses, means controlled by said impulse repeating relay in response to another of said series of impulses for operating said first switch one step for each impulse, a pulse generator for generating a series of pulses, means controlled by said pulses for operating said second switch one step for each pulse, means controlled by a correspondence condition between said first and said second switches for stopping said pulse generator, and means controlled by said pulses for completing the advance of said switch train to said calling line.

22. In a reverting call system, a reverting call switch circuit, a series of switches comprising a switch train, a first switch and a second switch in said reverting call switch circuit, means for connecting a calling station on a calling line to said reverting call switch circuit, means controlled in response to the dialing of the series of impulses of a directory number of a called station on said calling line for operating an impulse repeating relay in accordance with said impulses, means controlled by said impulse repeating relay in response to a portion of said series of impulses for advancing a portion of said switch train towards said calling line and for operating said first switch one step for each series of said portion of the series of impulses, means controlled by said impulse repeating relay in response to another of said series of impulses for operating said first switch one step for each impulse, a pulse generator for generating a series of pulses, means controlled by said pulses for operating said second switch one step for each pulse, means controlled by a correspondence condition between said first and said second switches for stopping said pulse generator, means controlled by said pulses for completing the advance of said switch train to said calling line, and means controlled by a station on said line for releasing the switches in said reverting call switch circuit.

23. In a reverting call system, a reverting call switch circuit, a series of switches comprising a switch train, a first switch and a second switch in said reverting call switch circuit, means for connecting a calling station on a calling line to said reverting call switch circuit, means controlled in response to the dialing of the series of impulses of a directory number of a called station on said calling line for operating an impulse repeating relay in accordance with said impulses, means controlled by said impulse repeating relay in response to a portion of said series of impulses for advancing a portion of said switch train towards said calling line and for operating said first switch one step for each series of said portion of the series of impulses, means controlled by said impulse repeating relay in response to another of said series of impulses for operating said first switch one step for each impulse, a pulse generator for generating a series of pulses, means controlled by said pulses for operating said second switch one step for each pulse, means controlled by a correspondence condition between said first and said second switches for stopping said pulse generator, means controlled by said pulses for completing the advance of said switch train to said calling line, means controlled by the removal of the receiver at a station on said line for releasing the switches in said reverting call switch circuit and for releasing a portion of said switch train, and means controlled in response to the receivers at all stations on said line being in their restored condition after said removal for releasing the remainder of said switch train.

24. In a telephone system; a party line; automatic switches including a final selector for calling said line; a reverting call switch; a pair of conductors defining a talking channel; a control conductor, said talking and control conductors inter-connecting said automatic switches and said reverting call switch; means in said reverting call switch responsive to a plurality of series of impulses transmitted from a calling station on said line for causing said final selector to signal a station on said line; means controlled by the response of a station to said signal for effecting the disconnection of said reverting call switch from said inter-connection, said disconnection being controlled over said control conductor.

25. In a telephone system, party lines, a plurality of automatic switches including one of a plurality of connectors, said one connector having line wipers for setting up a reverting call ringing connection to one of said party lines, a reverting call control circuit common to said plurality of connectors, a ringing control wiper on said one connector, means for extending a connection from a calling line to said reverting call control circuit, means controlled over said calling line for causing said reverting call control circuit to set up said reverting call ringing connection, and means including said ringing control wiper for causing said connector to apply a distinctive ringing signal to said party line in accordance with the setting of said reverting call ringing connection.

26. In a telephone system, a calling line, a party line connector of the terminal-per-station type having line wipers for setting up a connection from said calling line to the terminals of a called line, a ringing control wiper on said connector operated simultaneously with said line wipers, a combination ringing and busy relay in said connector, means for uninterruptedly operating said relay when said wipers are connected to the terminals of a busy line for applying a busy signal to said calling line, an energizing circuit for said relay including said ringing control wiper, and means for intermittently operating said relay over a circuit including said ringing control wiper for ringing said called line.

GEORGE ELLIOTT.

References Cited in the file of this patent

UNITED STATES PATENTS

| Number | Name | Date |
|---|---|---|
| 1,610,438 | Gardner et al. | Dec. 14, 1926 |
| 1,735,378 | Willis | Apr. 22, 1930 |
| 1,910,972 | Stokely | May 23, 1933 |
| 2,164,731 | Bascom | July 4, 1939 |
| 2,187,186 | Wallace | Jan. 16, 1940 |
| 2,335,473 | Bakker | Nov. 30, 1943 |
| 2,443,945 | Bellamy | June 22, 1948 |

Certificate of Correction

Patent No. 2,659,769

November 17, 1953

George Elliott

It is hereby certified that error appears in the printed specification of the above numbered patent requiring correction as follows:

Column 11, line 1, after "SW" insert *to*; column 19, line 6, strike out "thereto";

and that the said Letters Patent should be read as corrected above, so that the same may conform to the record of the case in the Patent Office.

Signed and sealed this 5th day of January, A. D. 1954.

[SEAL]

ARTHUR W. CROCKER,
*Assistant Commissioner of Patents.*